March 3, 1931.  E. BECKMANN  1,794,509

ALTERNATING CURRENT INDICATOR

Filed Jan. 4, 1929

Inventor
Erich Beckmann
by Knight Bros
Attorneys

Patented Mar. 3, 1931

1,794,509

UNITED STATES PATENT OFFICE

ERICH BECKMANN, OF HANOVER, GERMANY

ALTERNATING-CURRENT INDICATOR

Application filed January 4, 1929, Serial No. 330,406, and in Germany November 20, 1926.

This invention relates to an alternating-current long-distance indicator which is designed according to the rotating-field principle and in which the alternating current flowing through the indicating coil is generated in known manner by induction. The invention proper resides in providing a separate circuit-closing iron path for the usual single phase flux through the indicating coil in such a manner that both fields do not materially influence one another with respect to their joint influence on the axially directed coil field.

Figure 1:
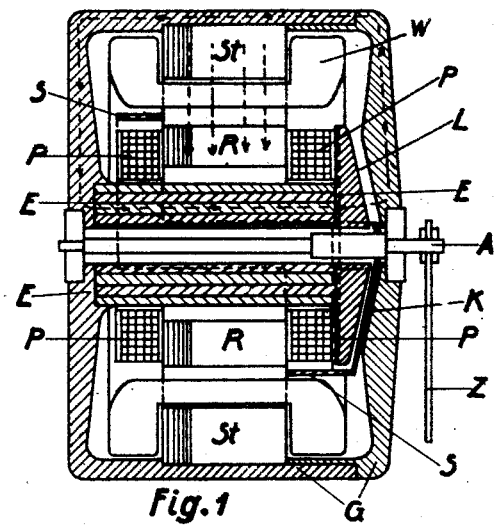
Figure 2:
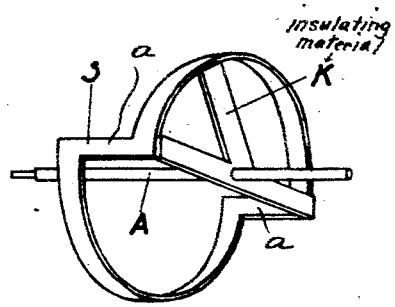
Figure 3:
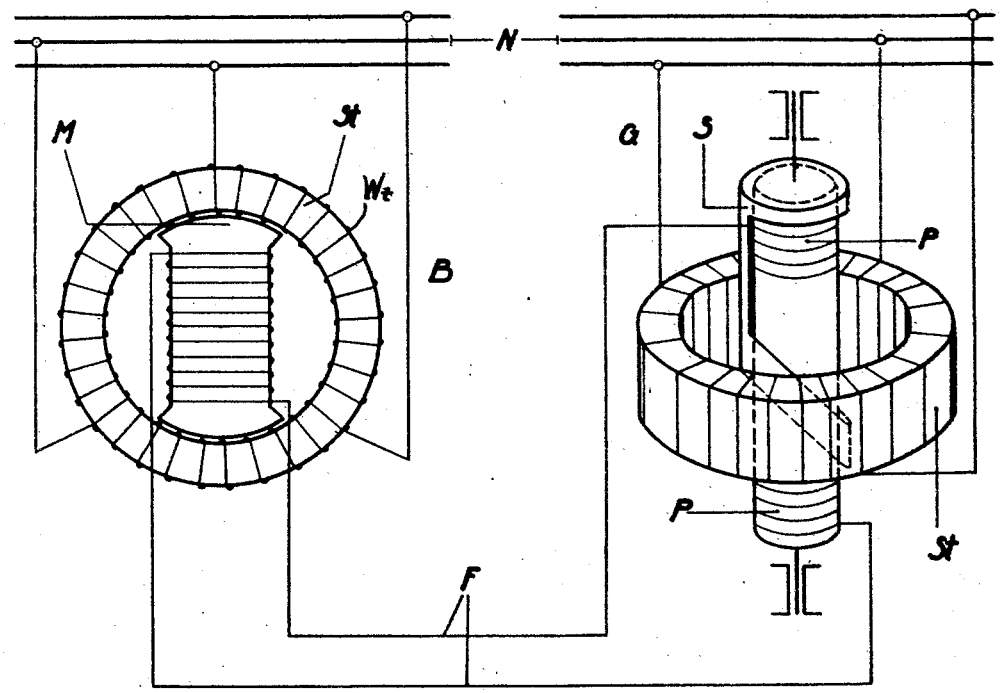

The invention is illustrated diagrammatically and by way of example in the accompanying drawing in which Figure 1 is a longitudinal vertical section through an alternating-current long-distance indicator or receiver designed according to this invention; Figure 2 is a perspective view of the adjusting coil turned by 180° relatively to Fig. 1; and Figure 3 is a wiring diagram connection between a receiver and a transmitter according to the invention.

The indicator or receiver illustrated in Fig. 1 consists of a stator St wound in multi-phase manner, the winding being shown at W; its field is closed across an annular air-gap by a laminated iron ring R. This latter is, in the constructional form shown as an example, stationary, and through it extends axially an iron core E which is concentrically laminated in longitudinal direction, and is fixed at one of its ends to the casing G which carries the stator and consists also of magnetic material.

Transformer coils P through which single-phase alternating current flows, are mounted upon the ends of core E, so that they practically abut against the ends of the ring R and serve as a support for the latter. The transformer field thereby produced is substantially closed only through the core E and the iron casing G of the receiver. An annular air-gap provided between the ring R and the core prevents substantially a mutual influence between the field created by the transformer winding P and the field created by the stator winding W, because owing to the concentric lamination of core E the stator flux finds it difficult to enter this core.

In the air-gap between the stator St and ring R an indicating coil S (see also Fig. 2) is rotatably disposed. It is preferably cut out from a piece of copper or aluminum tubing by cutting away two rectangular segmental portions located on diametrically opposite sides. To this remaining skeleton, which forms thus a coil with two axially offset half turns, are attached spokes K consisting of a material which is magnetically and electrically a poor conductor. Thus disposed, this coil therefore includes in axial direction only the flux produced by winding P, and is only radially cut by the flux produced by stator winding W, which latter flux is prevented from axially permeating the coil by the aforementioned laminations.

The flux through core E is interrupted at one of the core ends by an air-gap L provided in casing G in which gap the spokes K of the indicating coil S can freely rotate. The axle A, which carries coil S and which freely passes through a central bore in core E, is journalled at both ends in casing G and bears a pointer A indicating on a graduated scale (not shown) the prevailing angular position of coil S.

The operation of the indicator or receiver is as follows:

The transformer field, produced in core E by the single phase current flowing in line F, to which transformer coil P is connected (see Fig. 3), generates in the indicating coil S, which can be regarded as a secondary transformer coil, a strong current, which, however, remains unaffected by the action in the stator field St at least to such an extent that its phase can vary only by a fraction of a quadrant. The current flowing through coil S produces its adjusting torque in the axially extending portions $a$, $a$ of the coil, which move in the gap between the stator St and ring R, the reaction on coil S being produced by this transformer current and the field produced by stator W, which cuts coil portions $a$, $a$ at right angles, and the phase of which relatively to the transformer current is determined by the position of the transmitter rotor M. The parts $a$, $a$ of the coil S represent, thus, so-to-say, the "sides" of a rotating coil which finds in the bipolar stator field only one distinct angular position for every position of the transmitter rotor M, viz. one position in which its current causes a reinforcement of the stator field.

The two magnetic circuits must be kept apart as much as possible by extending the laminations of their paths at right angles to each other as shown, and in each circuit the laminations must be fine enough, or equivalent other means must be employed, in order to suppress as much as possible short-circuiting and the formation of eddy currents.

In the wiring diagram shown in Fig. 3 the multiphase coils W$t$ of the transmitter B wound on its stator S$t$, and the corresponding coils W of the receiver G are connected to the same three-phase net N. The armature M of the transmitter which is rotatably supported in the stator field of the transmitter is connected across long-distance lines F with the exciting coils P of the transformer field. The amount of the voltage produced in the transmitter rotor is independent of the position of this rotor, but its phase passes, at a complete revolution of the rotor through all four quadrants.

With the voltage phase of the transmitter rotor M also the phase of the current induced in the indicating coil S of the receiver varies. For each angular position of the phase vector exists only one angular position of the indicating coil S in which the current induced in the latter produces the maximum re-inforcement of the stator field of the receiver. The coil S adjusts itself to this point. In order to obviate the effect of a short-circuit armature, that is to say, in order to obviate a torque produced alone by the multiphase field relatively to the coil S, this coil is subdivided so much, respectively made so thin and narrow, that no appreciable eddy currents can arise in it. The system may then be regarded as a phasemeter distinguished by the advantage that only two long-distance lines are requisite for every individual receiver.

Instead of the three phase transmitter shown in Fig. 3 by way of example, any other known rotating field system may be used.

According to the purpose of the transmitting system, the transmitter armature M may be set into the desired position either manually or by the object whose position is to be indicated at a distance, for instance by a water-level indicator actuated by a float.

I claim:

1. An alternating current long distance indicator operating according to the rotary field principle and comprising in combination a casing of magnetic material having a stator and a rotary field winding thereon, a central core in said casing having at least one single phase winding, an indicating coil rotatable around the core axis in said rotary stator field, and having the portions passing through said field cut by the flux in radial direction, said coil being suitably shaped with respect to said core winding to include the core flux in the direction of the coil axis, constituting thereby a secondary winding to said core winding in which a current is induced in phase with the single phase current flowing in said core winding, and an iron ring surrounding said core and closing the magnetic stator circuit, and means on said ring and on said core for preventing the stator flux from passing in axial direction through said indicating coil.

2. An alternating current long distance indicator operating according to the rotary field principle and comprising in combination a casing of magnetic material having a stator and a rotary field winding thereon, a central core in said casing having at least one single phase winding, an indicating coil rotatable around the core axis in said rotary stator field, and having the portions passing through said field cut by the flux in radial direction, said coil being suitably shaped with respect to said core winding to include the core flux in the direction of the coil axis constituting thereby a secondary winding to said core winding in which a current is induced in phase with the single phase current flowing in said core winding, and an iron ring surrounding said core and closing the magnetic stator circuit, laminations on said ring and on said core suitably directed relatively to each other to substantially prevent the passage of the stator flux in axial direction through said coil, said ring being separated from said core by an annular gap to additionally prevent the stator flux in said ring from axially passing through said coil.

3. An alternating current long distance indicator operating according to the rotary field principle and comprising in combination a casing of magnetic material having a stator and a rotary field winding thereon, a core centrally fixed at one end to said casing and forming a gap at its other end with the other casing end, said core having at least one single phase winding, an indicating coil rotatable around the core axis in said rotary stator field, and having the portions passing through said field cut by the flux in radial direction, said coil being suitably shaped with respect to said core winding to include the core flux in the direction of the coil axis, constituting thereby a secondary winding to said core winding in which a current is induced in phase with the single phase current flowing in said core winding, and an iron ring surrounding said core and closing the magnetic stator circuit, said core being concentrically laminated in axial direction, and said stator and said ring being laminated in a direction at right angles to the core axis to substantially prevent the passage of the stator flux in axial direction through said coil, said ring being separated from said core by an annular gap to additionally prevent the ring flux from reacting upon the core flux, said coil having radial supporting arms of non-magnetic and electrically poorly conducting material and being disposed to rotate in the gap formed between the core end and said casing.

4. An alternating current long distance indicator operating according to the rotary field principle and comprising in combination a casing of magnetic material having a stator and a rotary field winding thereon, a central core in said casing having at least one single phase winding, an indicating coil rotatable around the core axis and having two semi-circular diametrically opposite disposed halves, offset a distance in axial direction, whereby two axially directed diametrically opposite straight coil portions are formed, said straight coil portions being disposed in said rotary stator field, said coil surrounding said core winding to include the core flux in the direction of the coil axis, constituting thereby a secondary winding to said core winding, in which a current is induced in phase with the single phase current flowing in said core winding, and an iron ring surrounding said core and closing the magnetic stator circuit, and laminations on said ring and on said core suitably directed relatively to each other to substantially prevent the passage of the stator flux in axial direction through said coil, said ring being separated from said core by an annular gap to additionally prevent the stator flux in said ring from axially passing through said coil.

In testimony whereof I affix my signature.

ERICH BECKMANN.